United States Patent [19]
Ikenoue et al.

[11] Patent Number: 4,513,360
[45] Date of Patent: * Apr. 23, 1985

[54] DC-DC CONVERTER HAVING ENERGY STORAGE INDUCTANCE ELEMENT CONNECTED IN FLYWHEEL CIRCUIT

[75] Inventors: Tsuneo Ikenoue, 14-6, Ichiban-cho 1-chome, Sendai-shi, Miyagi; Shin-yng Liu, Miyagi; Naoki Arai, Tokyo; Shuichi Umemoto, Kanagawa, all of Japan

[73] Assignees: Tsuneo Ikenoue; Tohoku Ricoh Co., Ltd.; Stanley Electric Co., Ltd.; Micron Kiki Co. Ltd., all of Tokyo, Japan

[*] Notice: The portion of the term of this patent subsequent to Nov. 2, 1999 has been disclaimed.

[21] Appl. No.: 413,991

[22] Filed: Sep. 2, 1982

Related U.S. Application Data

[63] Continuation-in-part of Ser. No. 216,924, Dec. 16, 1980, Pat. No. 4,357,654.

[30] Foreign Application Priority Data

Dec. 19, 1979 [JP] Japan ................................ 54-165012

[51] Int. Cl.³ .................... H02M 3/335; H02M 3/155
[52] U.S. Cl. ........................................ 363/20; 363/48; 323/282; 323/290; 323/351
[58] Field of Search ..................... 363/20, 21, 53, 126, 363/127; 323/271, 272, 282–290, 351, 222, 224

[56] References Cited

U.S. PATENT DOCUMENTS

| 3,518,527 | 6/1970 | Russell | 323/282 |
| 3,577,065 | 5/1971 | Putzrath et al. | 323/287 |
| 3,582,758 | 6/1971 | Gunn | 363/127 |
| 3,621,372 | 11/1971 | Paine | 323/287 |
| 3,735,235 | 5/1973 | Hamilton et al. | 363/26 |
| 3,851,240 | 11/1974 | Park et al. | 363/127 |
| 4,189,767 | 2/1980 | Snyder | 363/37 |
| 4,349,776 | 9/1982 | Federico et al. | 323/224 |

FOREIGN PATENT DOCUMENTS 119096 3/1970 Norway .............................. 323/289

OTHER PUBLICATIONS

EDN/EEE, pp. 22–24, Dec. 15, 1971, L7240 0080, "Choose the Right Commutating Diode for Switching Regulators".

Primary Examiner—William H. Beha, Jr.
Attorney, Agent, or Firm—Burgess, Ryan & Wayne

[57] ABSTRACT

In a DC-DC converter of the type in which an inductance stores energy when a main switching transistor is turned on and releases the stored energy when the main switching transistor is turned off, a semiconductor active element is used as a flywheel element which is turned off when the main switching element is turned on, but is turned on to provide the path for the current established by the release of the stored energy, and the signal which is substantially in synchronism with the switching operation of the main switching transistor is applied to the control terminal of the semiconductor active element so as to cause it to turn on and off.

5 Claims, 5 Drawing Figures

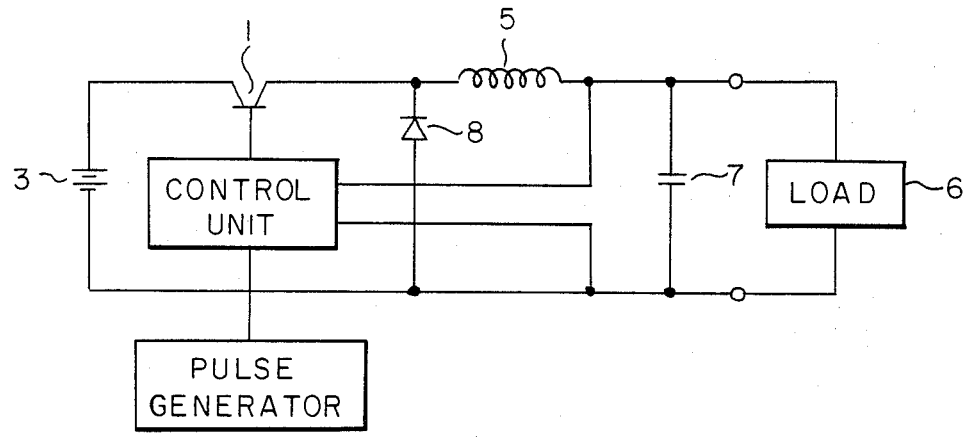
FIG. I
PRIOR ART
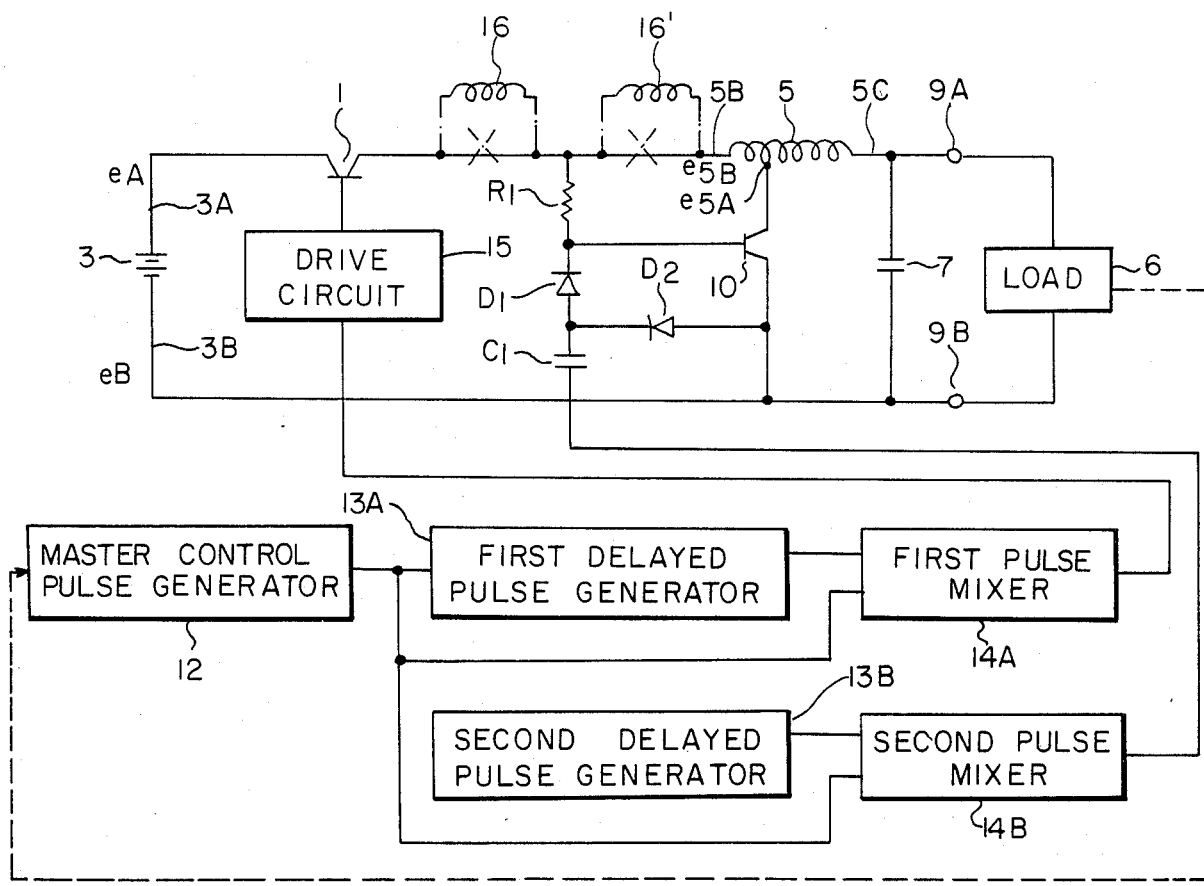
FIG. 2

DC-DC CONVERTER HAVING ENERGY STORAGE INDUCTANCE ELEMENT CONNECTED IN FLYWHEEL CIRCUIT

CROSS REFERENCE TO RELATED APPLICATION

This is a continuation in part of co-pending application Ser. No. 216,924 filed Dec. 16, 1980 and now issued as U.S. Pat. No. 4,357,654.

BACKGROUND OF THE INVENTION

The present invention relates to a DC-DC converter especially of the type in which a semiconductor active element such as a transistor is used instead of a flywheel or catching diode which provides a path for a current when a main switching transistor is turned off.

The efficiency of the DC-DC converters is much influenced not only by the characteristics of main switching transistors but also by the characteristics of flywheel diodes as will be described in detail below. The forward voltage drop of the flywheel diodes greatly influences the efficiency especially when the output voltages of the DC-DC converters are low. A recovery time and a reverse recovery time of the transient characteristics influence the efficiency. More specifically, when a forward recovery time and a reverse recovery time become comparable with respect to the operating or on-off frequency of a main switching transistor, the losses caused during the recovery time adversely affects the efficiency. In the DC-DC converters, a current or voltage applied across a flywheel diode abruptly rises and falls so that the losses due to the transient characteristics give rise to a serious problem especially when the switching frequency is high. Therefore, the Schottky barrier type diodes or fast-recovery type diodes have been used as the flywheel diodes, but the diodes with a reverse recovery time of less than 50 ns are not available so that it is difficult to attain a higher degree of efficiency at higher frequencies. The Schottky barrier type diodes are advantageous over the fast-recovery type diodes in that the forward voltage drop is small and the turn-off time is shorter, but their breakdown voltage is low so that they can be used only at low voltages. The forward voltage drops of these diodes are of the order of 0.5 V at the maximum current ratings and will exceed 0.25 V and 0.2 V, respectively, even when they are used at a tenth and a hundredth of the maximum current ratings. Therefore, with the Schottky barrier type diodes and a fast-recovery type diodes, the attainable characteristics and efficiency of the DC-DC converters are limited. Furthermore, the maximum switching frequency is also limited.

In the phase detectors (such as phase discriminators, phase sensitive amplifiers, lock-in amplifiers) which are used in communication equipment and measuring instruments, semiconductor active elements such as FETs, bipolar transistors, etc. have been long used as rectifying elements, so that it may be considered that such semiconductor active elements can substitute the flywheel diodes in the DC-DC converters. However, so far no attempt has been successful. The transistors have many advantageous features such as a low forward resistance, a high reverse resistance, excellent transient characteristics, so that if they could be used instead of the conventional flywheel diodes, the DC-DC converters which can operate at higher frequencies with a higher degree of efficiency could be provided. However, in practice, it is extremely difficult to attain the correct synchronization between the on-off operations of a main switching transistor and a transistor which is used as a flywheel diode. Mainly because of the manufacturing tolerances, the characteristics of the main switching transistors and flywheel transistors vary from one another. As a result, a flywheel transistor (that is, the transistor used instead of a flywheel diode) is turned on before a main switching transistor is turned on, so that an excessive reverse current flows into the flywheel transistor. Even when the on-off operation of the flywheel transistor can be correctly synchronized with that of the main switching transistor, an excess reverse current flows into the flywheel transistor due to the difference in instantaneous voltage between the main switching transistor and the flywheel transistor in the transient periods, so that the flywheel transistor is damaged or degraded. When the flywheel transistor is turned on after the main switching transistor has been turned off, the drop in efficiency inevitably results. Thus, it has been extremely difficult in practice to use the semiconductor active elements as the flywheel diodes in order to operate the DC-DC converters at higher frequencies with a higher degree of efficiency.

SUMMARY OF THE INVENTION

The present invention was made to overcome the above and other problems encountered in the prior art DC-DC converters and has for its object to provide a DC-DC converter in which a semiconductor active element is utilized as a flywheel diode and which can operate even at high frequencies with a higher degree of efficiency.

The present invention provides a DC-DC converter of the type in which, when a main switching transistor is turned on, the energy is stored on an inductor and when the main switching transistor is turned off, the energy stored on the inductor is discharged, characterized in that a semiconductor active element is utilized as a flywheel element which is turned off when the main switching transistor is turned on but is turned on when the main switching transistor is turned off so as to provide a path for the current flowing from the inductor; and the signal substantially in synchronism with the switching operation of the main switching transistor is applied to the control terminal of the semiconductor element so as to turn on and off the semiconductor element.

In this specification, the term "DC-DC converters" refer to all the DC-DC converters utilizing the flywheel elements such as the chopper type DC-DC converters, the transformer isolation type forward DC-DC converters and so on.

BRIEF DESCRIPTION OF THE DRAWINGS

FIG. 1 is a block diagram of a prior art DC-DC converter;

FIG. 2 is a block diagram of a first embodiment of the present invention applied to a chopper type DC-DC converter;

CONCRETE DESCRIPTION OF THE PRIOR ART

Figure 3:
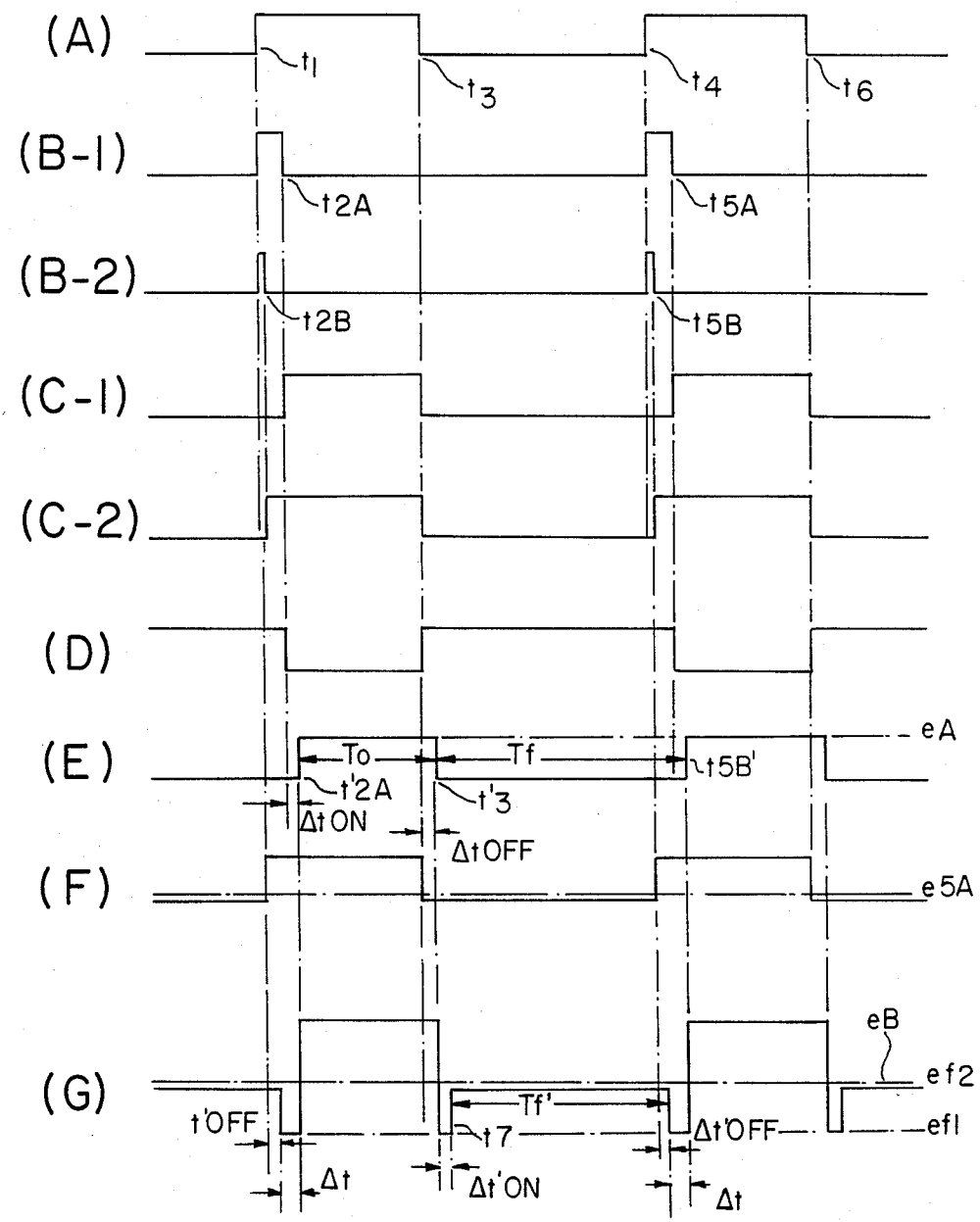
FIG. 3 is a timing chart used for the explanation of the mode of operation of the first embodiment.

Referring first to FIG. 1, a chopper type switching regulator will be described as an example of the prior art DC-DC converters. When a main switching transistor 1 is turned on, the power is supplied from a power source 3 through the main switching transistor 1 and a coil 5 to a load 6. When the main switching transistor 1 is turned off, the energy stored on the coil 5 when the main switching transistor 1 was turned on induces a current which flows into the load 6 and the current from the latter flows through a flywheel diode 8. When the main switching transistor 1 is turned on, the flywheel diode 8 is reverse biased so that it remains turned off. At the instant when the main switching transistor 1 is turned off, the energy stored on the coil 5 is discharged so that the flywheel diode 8 is forward biased. When the switching transistor 1 is turned on again, the flywheel diode 8 is turned off again. The above-described operation is repeated at a predetermined frequency and the ratio of the ON interval to the OFF interval is varied in response to the variations in output voltage so that even when the input voltage varies much or less, the output voltage can be maintained almost at a constant level. However, as described previously, the prior art DC-DC converter has the problems.

DESCRIPTION OF THE PREFERRED EMBODIMENTS

First Embodiment, FIGS. 2 and 3

FIG. 2 shows a first embodiment of the present invention which is applied to a chopper type switching regulator. The positive terminal 3A of the DC voltage source 3 is connected to the emitter of the PNP transistor 1 whose collector is connected to the positive output terminal 9A through the coil 5 which is an inductor for storing the energy. The negative terminal 3B of the DC voltage source 3 is directly connected to the negative output terminal 9B. A smoothing capacitor 7 is connected between the output terminals 9A and 9B. The tap 5A of the coil 5 is connected to the collector of a PNP transistor 10, which is a semiconductor active element corresponding to the flywheel diode (catching diode) 8 shown in FIG. 1 and will be referred to as "the flywheel transistor" in this specification. The emitter of the flywheel transistor 10 is connected to the negative output terminal 9B.

A master control pulse generator 12 receives as an input the voltage across the load 6. The output terminal of the master control pulse generator 12 is coupled to first and second delayed pulse generators or time-delay circuits 13A and 13B which generate the pulses which rise in response to leading edge of the master control pulse, but have different short pulse durations, respectively. The master control pulse generator 12 is also coupled to a first pulse mixer 14A and a second pulse mixer 14B. The output terminals of the first and second delayed pulse generators 13A and 13B are coupled to the first and second pulse mixers 14A and 14B, respectively.

The output from the first pulse mixer 14A rises in response to the trailing edge of the delayed pulse from the first delayed pulse generator 13A and falls in response to the trailing edge of the master control pulse and is applied to a drive circuit 15. The drive circuit 15 reverses the output from the first pulse mixer 14A and applies it as the drive pulse to the base of the main switching transistor 1. The output from the second delayed pulse generator 14B rises in response to the trailing edge of the delayed pulse from the second delayed pulse generator 13B and falls in response to the trailing edge of the master control pulse. The output terminal of the second pulse mixer 14B is coupled through a capacitor $C_1$ and a diode $D_1$ to the base of the flywheel transistor 10 which in turn is connected through a resistor $R_1$ to the junction between the collector of the main switching transistor 1 and the coil 5. The junction between the capacitor $C_1$ and the diode $D_1$ is connected through a diode $D_2$ to the emitter of the flywheel transistor 10.

The main switching transistor 1 operates in response to the drive pulse applied to the base thereof from the drive circuit 15. The flywheel transistor 10 is turned off in response to the pulse signal applied to its base from the second pulse mixer 14B through the capacitor $C_1$ and the diode $D_1$. When the main switching transistor 1 is turned off, the base voltage of the flywheel transistor 10 drops to a lower level because of the voltage induced across the coil 5 between the end 5B and the tap 5A, so that the flywheel transistor 10 is turned on.

The master control pulse generator 12 receives as an input the voltage across the load 6 as indicated by the dotted line. In order to control the phases of the voltages of the transistors 1 and 10, the times when the pulses applied to the transistors 1 and 10 fall are advanced. (A circuit for effecting this operation is not shown.) The first delayed pulse generator 13A and the first pulse mixer 14A coact to adjust the relationship in phase between the voltage of the load circuit of the transistor 1 and the voltage of the load circuit of the transistor 10. In addition, they have a function of advancing the time when the control voltage pulse applied to the transistor 10 falls so that the timing for turning off the transistor 10 is advanced and subsequently the time when the voltage of the load circuit of the transistor 10 falls can be correctly synchronized with the time when the voltage of the load circuit of the transistor 1 falls. Thus, the losses caused when the transistor 10 is turned off can be eliminated.

The mode of operation of the first embodiment will be described in more detail with reference to FIG. 3. (A) shows the master control pulse from the master control pulse generator 12; (B-1), the output pulse from the first delayed pulse generator 13A; (B-2), the output pulse from the second delayed pulse generator 13B; (C-1), the output pulse from the first pulse mixer 14A; (C-2), the output pulse from the second pulse mixer 14B; (D), the output pulse from the drive circuit 15; (E), the collector-to-emitter voltage $V_{CE}$ of the main switching transistor 1; (F), the base voltage of the flywheel transistor 10; and (G), the voltage waveform across the flywheel transistor, the negative voltage being the forward voltage drop while the positive voltage being the reverse voltage, the reference value being $e_B$.

The output pulses (B-1, B-2) from the first and second delayed pulse generators 13A and 13B rise at $t_1$ in response to the leading edge of the master control pulse (A) and fall at $t_{2A}$ and $t_{2B}$, respectively, after short durations. The output pulse (C-1) from the first pulse mixer 14A rises in response to the trailing edge of the first delayed pulse (B-1) at $t_{2A}$ and falls in response to the trailing edge of the master control pulse (A) at $t_3$. In like manner, the output pulse (C-2) from the second pulse mixer 14B rises in response to the trailing edge of the second delayed pulse (B-2) at $t_{2B}$ and falls at $t_3$ in response to the trailing edge of the master control pulse (A). The output pulse (C-1) from the first pulse mixer 14A is reversed by the driver circuit 15 as indicated at (D) and applied to the base of the main switching transistor 1 so that the $V_{CE}$ of the main switching transistor 1 rises for a time interval $T_o$ from $t'_{2A}$ to $t'_3$. The rise of $V_{CE}$ is delayed from $t_{2A}$ by $\Delta t_{on}$ (the turn-on time; that is, the sum of the delay time $t_d$ and the rise time $t_r$) and is also delayed from $t_3$ by $\Delta t_{off}$ (the turn-off time; that is, the sum of the storage time $t_s$ and the fall time $t_f$). The main switching transistor 1 is turned off for a time interval $T_f$ (See (E)). The base voltage (F) of the flywheel transistor 10 rises at $t_{2B}$ and falls at $t_3$. Assume that the reference voltage $e_{5A}$ has a rectangular waveform even though it actually has the wave form as shown at (G). Then the voltage $e_{5B}$ at the tap 5A (See FIG. 2) has a similar rectangular waveform. $e_{5B}$ is greater in amplitude than $e_{5A}$. $e_A$ (E) is synchronized with $e_B$ (G); that is, the leading and trailing edges of $e_A$ are synchronized with those of $e_B$. As a result, the voltage representative of the difference between them is also synchronized with them.

More specifically, when the main switching transistor 1 is turned on for the time interval $T_o$, the voltage $e_{5B}$ at the end 5B of the coil 5 is higher than the voltage $e_{5A}$ at the tap 5A and the voltage $e_B$ at the negative terminal 3B of the DC voltage source 3, so that the base voltage of the flywheel transistor 10 is applied with the voltage $e_{5B}$ through the resistor $R_1$. As a result, the base voltage is higher than the emitter and collector voltages so that the flywheel transistor 10 is turned off. At $t'_3$ the main switching transistor 1 is turned off, so that the counter electromotive force is produced in the coil 5, so that $e_{5A}$ drops below the emitter voltage ($=e_B$) and the voltage $e_{5B}$ becomes lower than the voltage $e_{5A}$ at the tap 5A by the self-induced EMF produced in the coil 5 between the end 5B and the tap 5A. As a result, the base voltage of the flywheel transistor 10 drops below the emitter voltage $e_B$ and the collector voltage $e_{5A}$ so that the flywheel transistor 10 is turned on from $t_7$ delayed from $t'_3$ by the turn-on time $\Delta t'_{on}$ of the flywheel transistor 10. During the time interval $\Delta t'_{on}$ from the time when the main switching transistor 1 is turned off at $t'_3$ to the time when the flywheel transistor 10 is turned on. After the flywheel transistor 10 is turned on, the current flows through the transistor 10. As a result, the voltage across the flywheel transistor is equal to the forward voltage drop of the transistor 10 for $\Delta t'_{on}$ as shown at (G) and then to the saturation collector-to-emitter voltage $e_{f2}$. This condition lasts for the time interval $T_{f/40}$. At $t_{5B}$, the rise of the output pulse (C-2) from the second pulse mixer 14B is applied through the capacitor $C_1$ and the diode $D_1$ to the base of the flywheel transistor 10 so that the base voltage (F) rises higher than the collector voltage $e_{5A}$ and the emitter voltage, so that the flywheel transistor 10 is turned off at a time delayed from the time $t_{5B}$ by the turn-off time $\Delta t'_{off}$ and then the main switching transistor 1 is turned on again. As a consequence, the flow of the excessive reverse current into the flywheel transistor 10 can be avoided. During the time interval $\Delta t$ from the time when the flywheel transistor 10 is turned off until the time when the main switching transistor 1 is turned on again, the current established by the self-induced EMF of the coil 5 flows through the flywheel transistor 10 so that the voltage difference or drop across the flywheel transistor becomes equal to the forward voltage drop $e_{f1}$ of the flywheel transistor 10 as shown at (G).

When the flywheel transistor 10 has satisfactory transient characteristics and a short turn-off time, the reverse current can be suppressed by the insertion of an inductor 16 or 16' with an inductance substantially lower than that of the coil between the main switching transistor 1 and the coil 5. This inductor 16 or 16' may be substituted by the leakage inductance of the coil 5 between the tap 5A and the end 5B. For instance, the coil 5 on a common core is divided into the coil between the tap 5A and one end 5B and the coil between the tap 5A and the other end 5C, and these coils are loosely coupled so that the leakage inductance may be obtained. Therefore, the first embodiment may be so modified that the master control pulse generator 12 is directly connected with the drive circuit 15, whereby the second delayed pulse generator 13B, the second pulse mixer 14B, the capacitor $C_1$, and the diode $D_1$ can be eliminated. With this modification, the DC-DC conversion with a higher degree of efficiency almost equal to that of the first embodiment utilizing the flywheel transistor turn-off pulse can be ensured.

Figure 4:
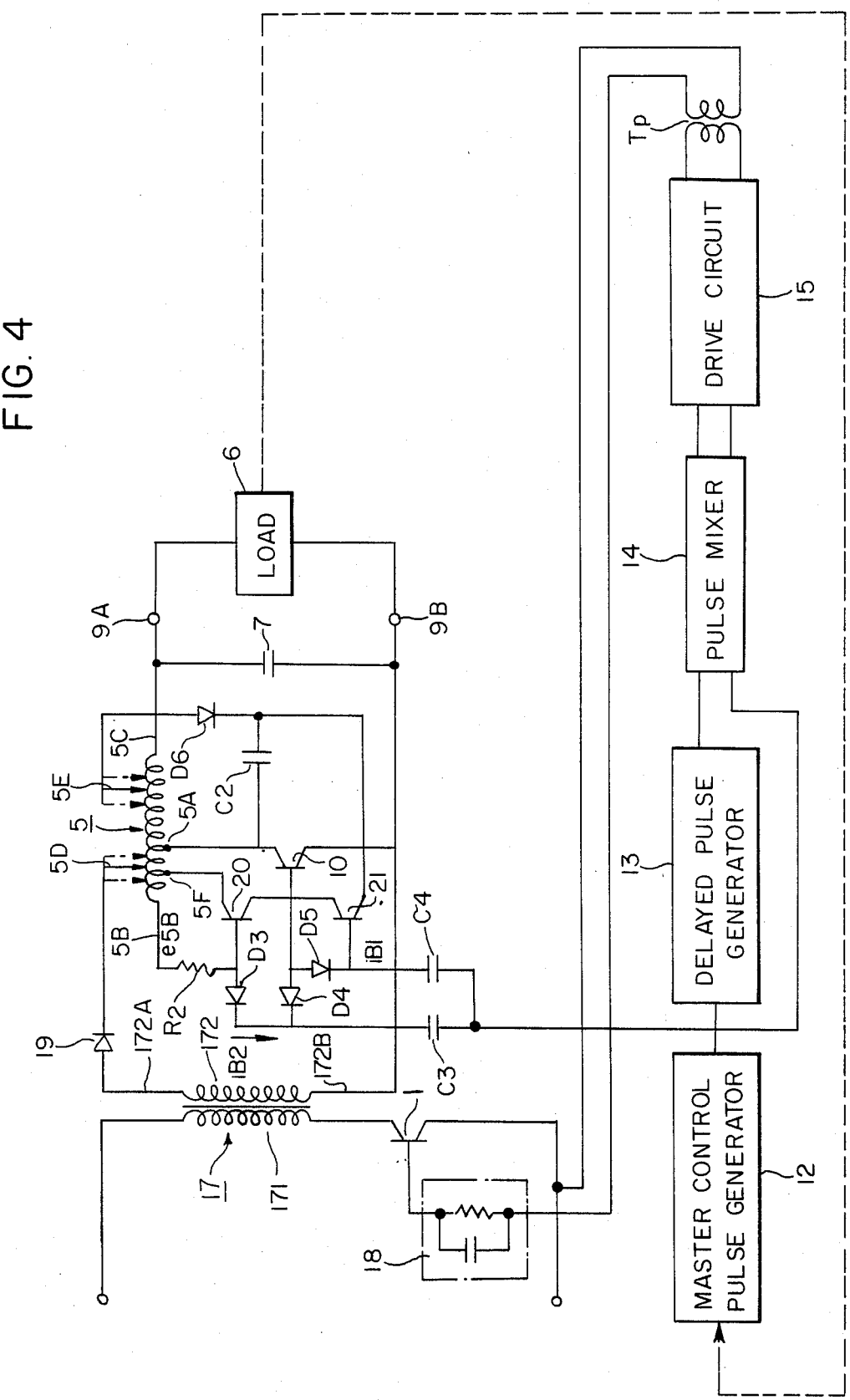
FIG. 4 is a block diagram of a second embodiment of the present invention applied to a transformer isolation type forward DC-DC converter.
Figure 5:
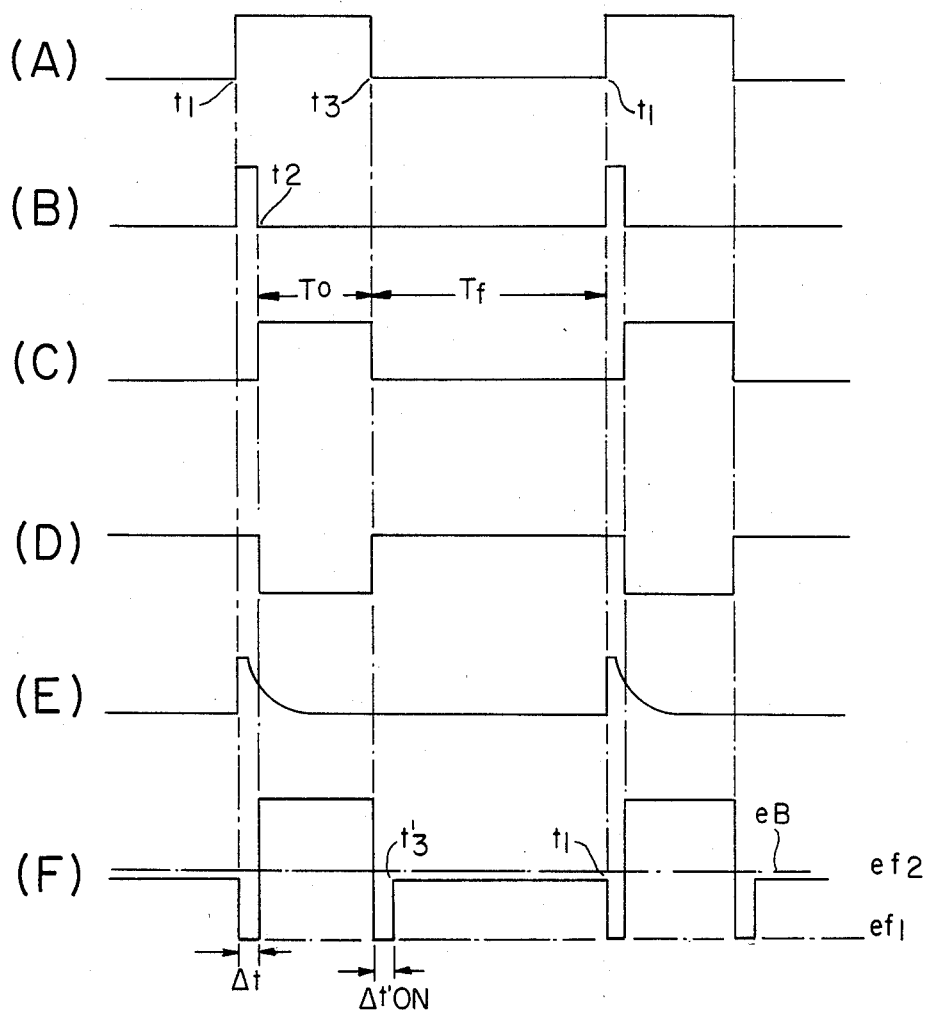
FIG. 5 is a timing chart used for the explanation of the second embodiment.

Second Embodiment, FIGS. 4 and 5

Referring to FIG. 4 showing a second embodiment of the present invention which is applied to a transformer isolation type forward DC-DC converter, one end of the primary coil 171 of the main transformer 17 is connected to the collector of the main switching transistor 1, and one end of the secondary coil of an isolation pulse transformer $T_p$ is connected to the base of the transistor 1. The output of the drive circuit 15 is coupled to the primary coil of the pulse transformer $T_p$ and the input of the drive circuit 15 is coupled through the pulse mixer 14, the delayed pulse generator or time-delay circuit 13 to the master control pulse generator 12. These circuits 12, 13 and 14 are substantially similar in function to those 12, 13A and 14A described previously with reference to FIG. 2. The positive terminal 172A of the secondary coil 172 of the main transformer 17 is connected through a speed-up diode 19 to a first tap 5D adjacent to one end 5B of the coil 5 which stores the energy. The other end 5C of the coil 5 is connected to the positive output terminal 9A. The negative terminal 172B of the secondary coil 172 of the main transformer 17 is connected to the negative output terminal 9B. The smoothing capacitor 7 is interconnected between the positive and negative terminals 9A and 9B. As with the first embodiment, the flywheel transistor 10 is interconnected between the center tap 5A of the coil 5 and the negative terminal 172B. The base of the flywheel transistor 10 is connected to the emitter of a transistor 20 which turns on the transistor 10 and whose collector is connected to a tap 5F of the coil 5 between the center tap 5A and one end 5B. The base of the flywheel transistor 10 is also connected to the emitter of a transistor 21 which turns off the transistor 10 and whose collector is connected through a diode $D_6$ to a tap 5E of the coil 5 between its center tap 5A and the other end 5C. The junction between the diode $D_6$ and the collector of the transistor 21 is connected through a capacitor $C_2$ to the collector of the flywheel transistor 10. The output of the master control pulse generator 12 is coupled through a capacitor $C_3$ and a diode $D_3$ to the base of the transistor 20 and to the base of the transistor 21 through a capacitor $C_4$. The base of the transistor 20 is connected through a resistor $R_2$ to one end 5B of the coil 5.

The junction between the emitters of the transistors 20 and 21 is connected to the base of the transistor 21 through a diode $D_5$ and to the junction between the diode $D_3$ and the capacitor $C_3$ through a diode $D_4$.

Next, referring further to FIG. 5, the mode of operation of the second embodiment will be described. (A) shows the master control pulse from the master control pulse generator 12; (B), the delayed pulse from the delay pulse generator 13 which rises in response to the leading edge of the master control pulse (A) at $t_1$ and lasts for a short duration until $t_2$; (C), the output pulse or control pulse from the pulse mixer 14 which rises at $t_2$ and falls at $t_3$ in synchronism with the trailing edge of the master control pulse (A), the control pulse (C) being applied to the drive circuit 15 whose output in turn is applied through the pulse transformer to the main switching transistor 1 so as to turn on and off the same at $t_2$ and $t_3$, respectively, when the turn-on time and turn-off time are neglected; (D), the collector-to-emitter voltage $V_{CE}$ of the main switching transistor 1; and (E), the turn-off pulse which is applied in response to the leading edge of the master control pulse through the capacitor $C_3$ and the diode $D_3$ to the base of the transistor 20 so as to flow the reverse current $i_{B2}$, thereby turning off the transistor 20 and consequently turning off the flywheel transistor 10 by dropping the base voltage thereof to a value almost equal to the emitter voltage. A similar pulse is also applied through the capacitor $C_4$ to the base of the transistor 21 so as to flow the forward current $i_{B1}$ thereby turning on the transistor 21. As a result, the emitter voltage of the transistor 21 approaches the voltage across the capacitor $C_2$ so that the current $i_{B2}$ for turning off the flywheel transistor 10 flows and the base is reverse biased. Thus, when the flywheel transistor 10 is turned off, the transistor 21 is turned on while the transistor 20 is turned off. (F) shows the voltage across the flywheel transistor 10. The voltage at the tap 5A relative to the point 9B (See FIG. 4) is plotted along the ordinate. It follows, therefore, that the voltage below the reference level $e_B$ is the forward voltage while the voltage above the reference level, the reverse voltage. The voltage during the time interval from $t'_3$ to $t_1$ exhibits a forward voltage drop. In (F), $e_{f1}$ depicts the forward voltage drop of the transistor 10 while $e_{f2}$, the saturated collector-to-emitter voltage of the transistor 10.

In the first and second embodiments, a means for varying the ratio of the turn-on time to the turn-off time of the main switching transistor 1 in response to the variations in output voltage in order to maintain the output voltage constant is not provided and shown, but it is to be understood that a conventional means for varying the pulse duration of the master control pulse in response to the output from an output voltage detecting means may be used.

In both the first and second embodiments, the flywheel transistor 10 has been described as being of NPN type, but it is to be understood that PNP transistors may be also used with some modification and that MOS FETs and FETs may be also used.

In summary, in the DC-DC converter according to the present invention, a semiconductor active element is utilized as a flywheel element instead of the diodes, and the high efficiency can be attained. In addition, the DC-DC converter can operate at high frequencies in a stable manner.

What is claimed is:

1. A DC-DC converter of the type in which an inductance element stores energy when a main switching transistor having a control electrode is turned on and releases the stored energy when the main switching transistor is turned off, comprising:
    a semiconductor active element used as a flywheel element which is turned off when said main switching transistor is turned on, and is turned on when said main switching transistor is turned off so as to provide a path for the current established by said release of said stored energy, said active element having a control terminal, said inductance element comprising a coil with a tap, connected in circuit so that the voltage induced between one end of said coil and said tap causes said semiconductor active element to turn on; and
    means for applying to the control terminal of said semiconductor active element a signal substantially synchronized with the operation of said main switching transistor thereby causing said semiconductor active element to turn on and off.

2. A DC-DC converter as set forth in claim 1, further comprising an inductance means with a very small value of inductance smaller than that of said coil is connected in series with said coil.

3. A DC-DC converter as set forth in claim 1, further comprising means for applying a pulse to the control terminal of said semiconductor active element prior to the leading edge of a drive pulse to be applied to the control electrode of said main switching transistor so as to turn on the same, thereby causing said semiconductor active element to turn off before said main switching transistor is turned on.

4. A DC-DC converter as set forth in claim 3 further comprising:
    a master control pulse generator for generating a master control pulse;
    a delayed pulse generator for generating a delayed pulse the leading edge of which is in synchronism with that of the master control pulse and the trailing edge of which falls after an extremely short predetermined duration as compared with the pulse duration of said master control pulse; and a pulse mixer for mixing the master control pulse and the delayed pulse so as to generate a composite pulse having a leading edge synchronized with that of said delayed pulse and a trailing edge synchronized with that of the master control pulse,
    whereby said main switching transistor is turned on in response to the master control pulse and said semiconductor active element is turned off in response to the leading edge of the composite pulse from said pulse mixer, so that said semiconductor active element is turned off before said main switching transistor is turned on.

5. A transformer isolation type forward DC-DC converter of the type in which an inductance element (i) stores energy when a main switching transistor connected to the primary coil of a main transformer is turned on, and (ii) releases the stored energy when the main switching transistor is turned off, comprising:
    a semiconductor active element which is used as a flywheel element which is turned off when said main switching transistor is turned on, but is turned on when said main switching transistor is turned off so as to provide a path for the current established by said release of said stored energy, said active element having a control terminal; said main transformer having a secondary coil connected through a rectifying element to said inductance element which in turn is connected to said semiconductor active element; and a means for applying to the control terminal of said semiconductor active element a switching signal substantially synchronized with the operation of said main switching transistor, thereby causing said semiconductor active element to turn on and off.

* * * * *